United States Patent
Pletersek et al.

(10) Patent No.: US 9,239,981 B2
(45) Date of Patent: Jan. 19, 2016

(54) RFID LABEL COMPRISING AN INTERFACE TO EXTERNAL SENSORS

(75) Inventors: Anton Pletersek, Orehova vas (SI); Kosta Kovacic, Maribor (SI); Andrej Vodopivec, Ljubljana (SI)

(73) Assignee: AMS R&D D.O.O., Ljubljana (SI)

( * ) Notice: Subject to any disclaimer, the term of this patent is extended or adjusted under 35 U.S.C. 154(b) by 637 days.

(21) Appl. No.: 13/503,005

(22) PCT Filed: Oct. 13, 2010

(86) PCT No.: PCT/SI2010/000056
§ 371 (c)(1),
(2), (4) Date: Apr. 19, 2012

(87) PCT Pub. No.: WO2011/049533
PCT Pub. Date: Apr. 28, 2011

(65) Prior Publication Data
US 2012/0206240 A1 Aug. 16, 2012

(30) Foreign Application Priority Data
Oct. 20, 2009 (SI) .................................. 200900310

(51) Int. Cl.
| | | |
|---|---|---|
| H04Q 5/22 | (2006.01) | |
| G08B 1/08 | (2006.01) | |
| G08C 19/16 | (2006.01) | |
| G06K 19/07 | (2006.01) | |
| G06K 19/077 | (2006.01) | |
| G01V 15/00 | (2006.01) | |
| G06K 7/00 | (2006.01) | |

(52) U.S. Cl.
CPC ............ *G06K 19/0723* (2013.01); *G01V 15/00* (2013.01); *G06K 19/077* (2013.01); *G06K 19/0717* (2013.01); *G06K 7/0008* (2013.01)

(58) Field of Classification Search
CPC ............ G06K 19/0723; G06K 7/0008; G06K 19/077; G06K 19/0717; G01V 15/00; H01L 23/5258; G01R 31/318502; G08C 15/00

USPC ........ 340/10.2, 10.51, 10.4, 10.33, 5.61, 539, 340/825.36, 539.26, 572.8, 539.22, 10.5; 701/117, 35; 709/224
See application file for complete search history.

(56) References Cited

U.S. PATENT DOCUMENTS

| | | | | |
|---|---|---|---|---|
| 6,015,021 A | * | 1/2000 | Tanaka et al. | ............... 180/206.2 |
| 6,633,335 B1 | * | 10/2003 | Kwon | ............ G01R 31/318502 341/120 |
| 6,720,866 B1 | | 4/2004 | Sorrells et al. | |

(Continued)

FOREIGN PATENT DOCUMENTS

| | | |
|---|---|---|
| EP | 1084423 B1 | 8/2005 |
| GB | 2428802 A | 2/2007 |
| WO | 2008065692 A2 | 6/2008 |

OTHER PUBLICATIONS

MLX90129 General Description and Data Sheet; http://www.melexis.com/General/General/MLX90129-631.aspx; Jun. 2012; 61 pages; Melexis Microelectronic Systems, Ieper, Belgium.

*Primary Examiner* — Mirza Alam
(74) *Attorney, Agent, or Firm* — McDermott Will & Emery LLP

(57) ABSTRACT

A sensor-front-end processor (SFEP) predrives external sensors during a predominant part of time. In a low-consumption state it waits to receive a command (sc; st) to acquire and condition sensor signals. After receiving the command it drives the sensors, sets its own measuring range, acquires a coarse code (ccc, vcc) of a current and voltage sensor signal, conditions said signal and acquires a signal fine code (ccf, vcf). The command (sc) is generated in adjustable time intervals. The sensor-front-end processor acquires and conditions the signals from the sensors consecutively one after another. The command (st) is generated whenever a request (irq) to interrupt predriving one of the sensors was generated, i.e. whenever a level of the sensor signal or its relative change with respect to the previous measurement drops out from an interval for this sensor. The detected codes are stored in the memory.

13 Claims, 2 Drawing Sheets

(56) References Cited

U.S. PATENT DOCUMENTS

Figure 1:
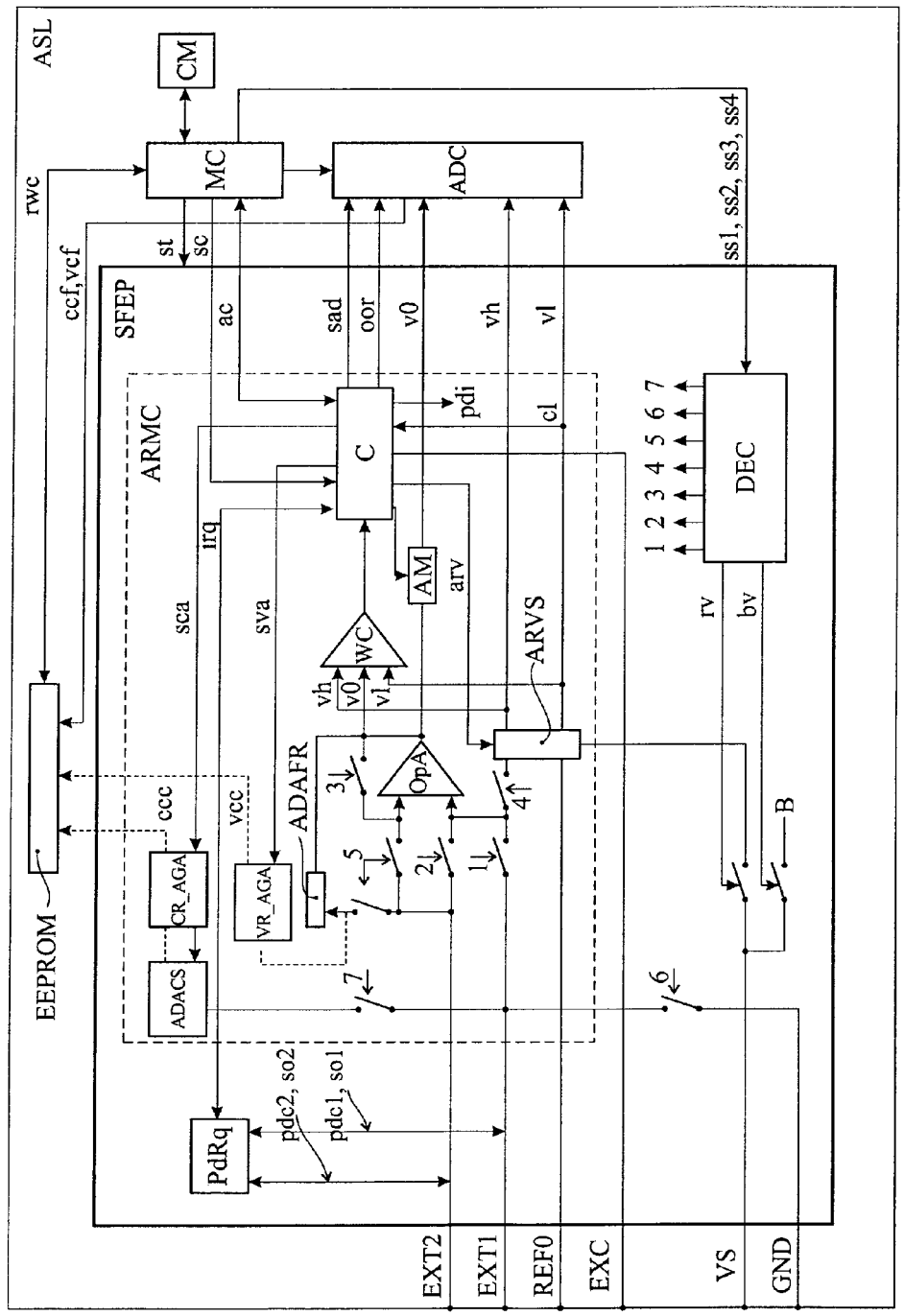

| | | | |
|---|---|---|---|
| 6,744,376 B1* | 6/2004 | Pascalidis | G08C 15/00 340/870.11 |
| 2004/0000713 A1* | 1/2004 | Yamashita | A61B 5/0002 257/728 |
| 2006/0103535 A1* | 5/2006 | Pahlaven et al. | 340/572.1 |
| 2008/0069176 A1* | 3/2008 | Pertijs et al. | G01K 15/00 374/1 |
| 2010/0060449 A1* | 3/2010 | Lertora | G01V 15/00 340/539.26 |

* cited by examiner

RFID LABEL COMPRISING AN INTERFACE TO EXTERNAL SENSORS

CROSS-REFERENCE TO RELATED APPLICATIONS

The present patent application is a nationalization of International application No. PCT/SI10/000056 filed Oct. 13, 2010, published in English, which is based on, and claims priority from, Slovenia Application No. P-200900310, filed Oct. 20, 2009, both of which are incorporated herein by reference in their entireties.

The present invention relates to a method for acquisition and conditioning of signals from external sensors by an RFID active, semiactive or passive smart label by means of a sensor-front-end processor for processing sensor signals. The invention also relates to a circuit for carrying out said method. The object of the invention is to propose said sensor-front-end processor, which should automatically function in an energy saving and a memory-space saving way as an interface between the RFID smart label and the external sensors of all possible types, which interface is to be programmable by a user.

The RFID smart label is usually self-sufficient, consequently it needs no additional external elements to function. This is certainly convenient as regards its price, yet a drawback to a possibility of upgrading and expanding its infrastructure. In fact, no external element or new function can usually be added to an integrated circuit of the RFID smart label.

Nevertheless, several external sensors of different types can be simultaneously connected to an RFID active or semiactive smart label through an interface. The RFID smart label then drives the external sensors as well as acquiring and processing data generated by said external sensors, e.g. data on temperature, humidity, illumination and other physical quantities.

There is known an RFID passive smart label provided with an interface to connect analogue and digital external sensors (EP 1 084 423 B1 and U.S. Pat. No. 6,720,866 B1). Acquisition of data from the external sensors is possible when an interrogator is present. Signals from the connected external sensors must be adapted to an applied analogue-to-digital converter, which narrows a selection of applicable external sensors.

There is also known a portable external sensor device for detecting movements by means of an accelerometer and a gyroscope (GB 2 428 802 A1). The device is assembled discretely and comprises an RFID chip as well but it is applied only for a data transfer. Data from the output of the external sensors are acquired and processed outside the RFID chip.

There is also known an integrated circuit MLX90129 of a tag for contactless identification (www.MELEXIS.com). It has two terminal assemblies for external sensors, which can only be resistor sensors or two resistor bridges. An external sensor input circuit makes it possible to set a gain and an offset voltage, yet it does neither allow for predriving, during which the integrated circuit would stand by, nor it uses presetting of levels to interrupt predriving. Hence, neither a storage-space saving nor an energy saving is made possible.

The technical problem to be solved by the present invention is to propose such method and such circuit of a sensor-front-end processor within an RFID smart label that will be able to acquire and condition signals from external sensors of any type whereat the sensor-front-end processor should be in a low-consumption state (standby) for the longest possible time and a user programmable microcontroller within the RFID smart label should automatically set a measuring range of said processor before an analogue-to-digital conversion of sensor signals.

Said technical problem is solved by the method of the invention for acquisition and conditioning of signals from external sensors by an RFID smart label as characterized by features of the characterizing portion of the first claim and the variants of said method as characterized by features of dependent claims 2 to 5 as well as by the circuit for carrying out said method as characterized by features of the characterizing portion of the sixth claim and the variants of said circuit as characterized by features of dependent claims 7 to 14.

The method and circuit of the invention for acquisition and conditioning of signals from external sensors by an RFID smart label are distinguished by a minimal activity of the sensor-front-end processor between two acquisitions of the sensor signals in the first as well the second operation mode of the RFID smart label whereby the energy saving and a long operating life of a battery in the RFID active or semiactive smart label are made possible. The way of storing data acquired by the external sensors just as well allows for a long use of the available memory.

The proposed sensor-front-end processor is a universal interface at the input of the RFID smart label, which in an entirely automatic way sets a measuring range of the sensor-front-end processor for each of the connected external sensors of an arbitrary type, before the analogue-to-digital conversion of the sensor signals has been performed.

The invention will now be explained in more detail by way of a description of an embodiment of a method of the invention for acquisition and conditioning of signals from external sensors by an RFID smart label as well as of a circuit for carrying out said method and with reference to the accompanying drawing representing in FIG. 1 a block diagram of the RFID smart label with connecting terminals for the external sensors, with a sensor-front-end processor of the invention and with a communication module, a microcontroller, an analogue-to-digital converter and a memory and FIG. 2 a block diagram of a generator of predrive currents and of a request to interrupt the predrive.

An RFID smart label, in FIG. 1 the RFID smart label ASL is represented, acquires and conditions signals from external sensors by means of a sensor-front-end processor SFEP of the invention, a microcontroller MC, an analogue-to-digital converter ADC and a programmable permanent memory EEPROM, which are integrated within said label.

According to the invention the sensor-front-end processor SFEP predrives the external sensors during a predominant part of time with low-intensity electric currents in the order of magnitude of ten nanoamperes. According to the invention the sensor-front-end processor SFEP is simultaneously in a low-consumption state (standby) consuming electric current with intensity below 250 nA.

According to the invention the sensor-front-end processor SFEP, while predriving, waits to receive from the microcontroller MC within the RFID smart label ASL a first command sc or a second command st, according to which commands signals from the external sensors will be acquired and conditioned.

Further according to the invention the sensor-front-end processor SFEP stops predriving the external sensors after it has received said first command sc or said second command st from the microcontroller MC. Then a temperature-stable precision source starts driving individual external sensors automatically and in a way corresponding to each external sensor.

At the same time the sensor-front-end processor SFEP automatically and in a way corresponding to the external sensor sets its own measuring range.

The sensor-front-end processor SFEP acquires a coarse code ccc, vcc of the current signal and the voltage signal, respectively, from this external sensor.

The sensor-front-end processor SFEP also conditions the signal from this external sensor.

The conditioned signal from the external sensor then enters the analogue-to-digital converter ADC within the RFID smart label ASL. Here the analogue-to-digital conversion of the signal from the external sensor is performed and a fine code ccf, vcf of the current signal and the voltage signal, respectively, from this external sensor is also acquired.

The coarse code ccc, vcc and the fine code ccf, vcf of the current signal and the voltage signal, respectively, from each external sensor are stored in the programmable permanent memory EEPROM.

Upon selection of the user, who communicates with the microcontroller MC through the communication module CM, the method of the invention can be carried out in two operation modes, which are represented as two embodiments of the method of the invention.

The method of the invention in the first operation mode is carried out in that the microcontroller MC puts out the first command sc to scan the external sensors in settable time intervals. After having received the command sc the sensor-front-end processor SFEP acquires and conditions output signals from all external sensors consecutively one after another.

In the first operation mode of the method of the invention only those data detected by an individual external sensor are stored in the programmable permanent memory EEPROM within the RFID smart label ASL, a level of which data or a relative change of said level with respect to the previous measurement drops out from a values interval for this external sensor as determined by the user.

The method of the invention in the second operation mode is carried out as follows: whenever the level of the signal from one of the external sensors or the relative change in said level with respect to the previous measurement drops out from the values interval for this external sensor as determined by the user, the sensor-front-end processor SFEP generates a request irq to interrupt predriving of said external sensor.

In the second operation mode, the sensor-front-end processor SFEP informs the microcontroller MC that it has generated the request irq to interrupt predriving of particular external sensor, whereafter the microcontroller MC puts out said second command st that the sensor-front-end processor SFEP should acquire and condition the output signal from said external sensor.

Data detected by said external sensor are now stored in the memory EEPROM within the RFID smart label ASL.

The continuation describes a circuit for acquisition and conditioning of signals from the external sensors by means of the RFID smart label, strictly speaking by means of the RFID smart label ASL as represented in FIG. 1, and by means of the sensor-front-end processor SFEP of the invention, which processes sensor signals and is integrated in the label.

Beside the sensor-front-end processor SFEP of the invention the RFID smart label ASL also comprises the communication module CM, the microcontroller MC connected to said communication module CM, the analogue-to-digital converter ADC and the programmable permanent memory EEPROM.

The sensor-front-end processor SFEP comprises a generator PdIRq for generating predrive currents pdc1, pdc2 and a request irq to interrupt the predrive, a circuit ARMC for an automatic setting of a measuring range and measuring as well as a decoder DEC.

Said generator PdIRq for generating predrive currents pdc1, pdc2 and the request irq to interrupt the predrive is connected to two connection terminals EXT1, EXT2 out of five connection terminals at the RFID smart label ASL, to which connection terminals the external sensors of different types are connected according to a table, which is a constituent part of the disclosure. Said generator PdIRq generates the low intensity currents pdc1, pdc2 to predrive external sensors for a predominant part of time. At the same time the sensor-front-end processor SFEP is in a low-consumption state.

In the already mentioned second operation mode of the RFID smart label ASL the generator PdIRq for generating predrive currents pdc1, pdc2 and the request irq to interrupt the predrive generates the request irq to interrupt predriving one of the external sensors, whenever the level of the signal put out from said external sensor or the relative change in said level with respect to the previous measurement drops out from the values interval for this external sensor as determined by the user.

The request irq to interrupt predriving is transferred to the controller C within the circuit ARMC for an automatic setting of the measuring range and the measuring whereat the controller C communicates with the microcontroller MC by means of a signal ac foreseen to control the acquisition. The microcontroller MC then changes a state of the signal st, which interrupts predriving in said external sensor on the one hand and triggers in the circuit ARMC the acquisition of the signal put out by said external sensor on the other hand. The data detected by said external sensor are then stored in the memory EEPROM within the RFID smart label ASL.

In the already mentioned first operation mode of the RFID smart label ASL the microcontroller MC carries out both operations mentioned above in that it puts out said command sc to scan all external sensors consecutively one after another. Only those data detected by an individual external sensor are stored in the memory EEPROM within the RFID smart label ASL, the level of which data or the relative change of said level with respect to the previous measurement drops out from a values interval for this external sensor as determined by the user. A memory space is saved in this way.

Figure 2:
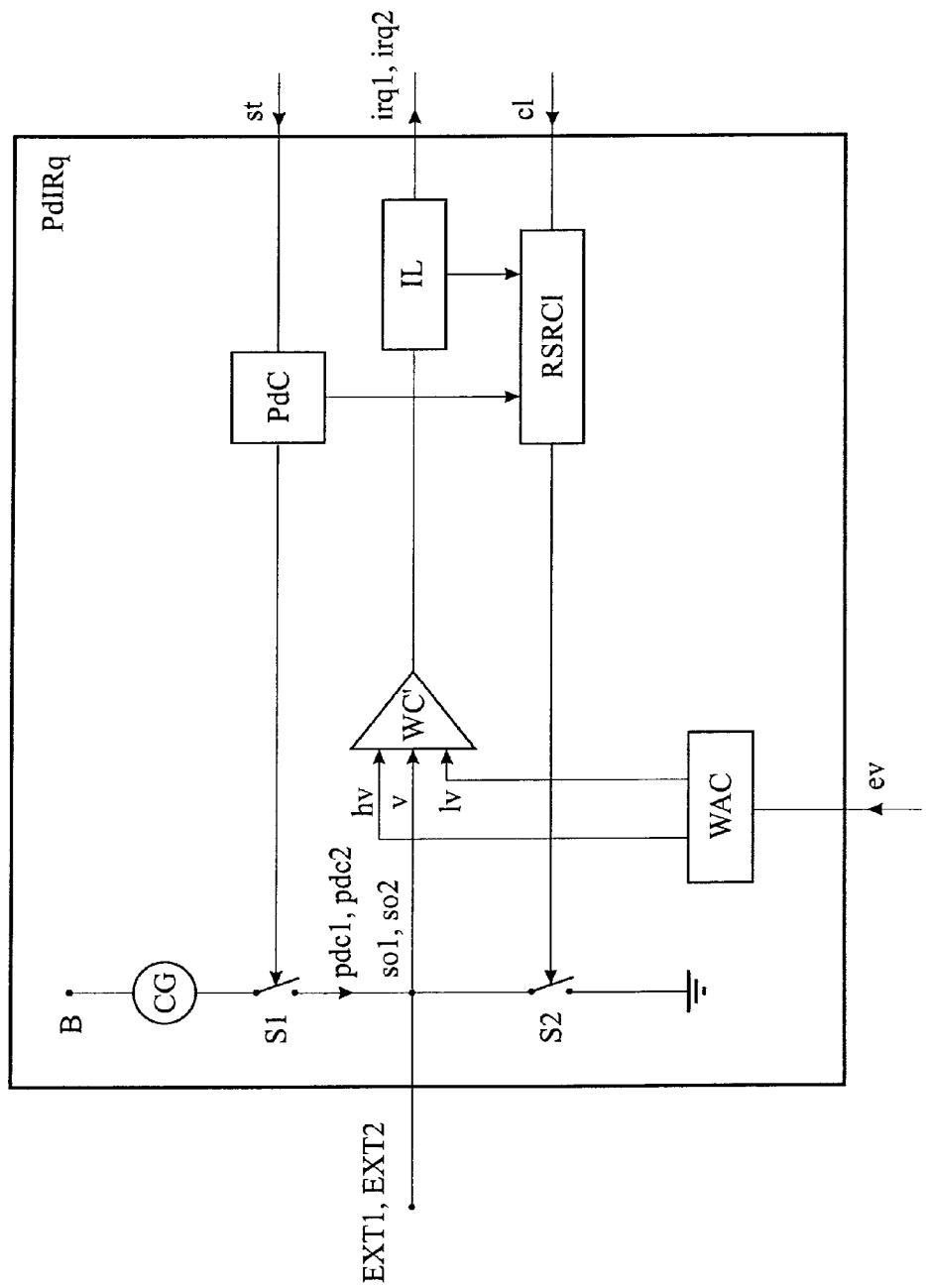

A block diagram of the generator PdIRq for generating predrive currents pdc1, pdc2 and the request irq to interrupt the predrive is represented in FIG. 2.

A current generator CG supplied by a battery B is connected to said connection terminals EXT1, EXT2 through a switch S1 controlled by a predrive controller PdC.

The predrive controller PdC controlled by the mentioned signal st controls a ratiometric source RSRC1 for reset and clock, which source also receives a clock signal c1 and controls a switch S2 for resetting said connection terminals EXT1, EXT2. The generator PdIRq hence generates the interrupt request irq ratiometrically with regard to the signal level for an individual external sensor as determined by the user.

An input signal so1, so2 put out by each of the external sensors, which are connected to said connection terminals EXT1, EXT2, is conducted to a window comparator WC' and an output signal of said window comparator WC' is conducted to an interrupt logic circuit IL. If the mentioned condition is fulfilled, the interrupt logic circuit IL puts out the request irq1 or irq2 to interrupt predriving of the first and second external sensor, respectively.

A window adjusting circuit WAC sets a high level hv and low level lv of the window comparator WC' with regard to a level ev set by the user for triggering the interruption for each individual external sensor.

Said circuit ARMC for the automatic setting of the measuring range and the measuring automatically sets the measuring range for each individual external sensor each time after the sensor-front-end processor SFEP stopped predriving the external sensors.

The circuit ARMC is adapted to the highest level of output signals from said external sensor in a way that a signal put out by the sensor-front-end processor SFEP for this external sensor will remain within the full range of the analogue-to-digital converter ADC.

Said circuit ARMC then measures a coarse code ccc, vcc of the current signal and the voltage signal, respectively, from each external sensor before the analogue-to-digital conversion of said signal has been performed.

A fine code ccf, vcf of the current signal and the voltage signal, respectively, from each external sensor are hereafter determined in the analogue-to-digital converter ADC.

The coarse code ccc, vcc and the fine code ccf, vcf of the current signal and the voltage signal, respectively, of each external sensor are stored in the programmable permanent memory EEPROM.

The circuit ARMC for the automatic setting of the measuring range and the measuring comprises also two temperature-stable precision sources to drive the external sensors during the measurement: an algorithmically digitally adjustable current source ADACS and an adjustable reference voltage source ARVS.

The circuit ARMC for an automatic setting of the measuring range and measuring comprises a circuit CR_AGA for an automatic current setting and the current precision source ADACS algorithmically digitally adjustable to drive the external sensors on the one hand and a circuit VR_AGA for an automatic voltage setting and an algorithmically digitally adjustable feedback resistor ADAFR of an operational amplifier OpA on the other hand.

By a stepwise increase in said output current said circuit CR_AGA for the automatic setting of the current generated by the current source ADACS for each individual external sensor provides for the signal from said external sensor to remain within the full range of the analogue-to-digital converter ADC. The current source ADACS arranged for driving said external sensor is algorithmically digitally adjusted by means of said circuit CR_AGA for the automatic setting of the current gain.

The circuit CR_AGA then receives a command sca to end the automatic adjusting of the current measuring range. Said command sca is generated in the controller C and based upon the output of the window comparator WC, to the input of which the signal v0 from said external sensor amplified by the operational amplifier OpA is conducted.

A high level vh and a low level vl at inputs of the window comparator WC are generated in the adjustable reference voltage source ARVS, which is controlled by a command arv to set reference voltages.

By a stepwise increase in said output voltage said circuit VR_AGA for the automatic setting of the output voltage of the adjustable reference voltage source ARVS for each individual external sensor provides for the signal from said external sensor to remain within the full range of the analogue-to-digital converter ADC. The feedback resistor ADAFR of the operational amplifier OpA is algorithmically digitally adjusted by means of said circuit VR_AGA for the automatic adjusting of the voltage.

The circuit VR_AGA then receives a command sva to end the automatic adjusting of the voltage measuring range. Said command is generated in the controller C and based upon the output of the window comparator WC, to the input of which the signal from said external sensor amplified by the operational amplifier OpA is conducted.

On each occasion the controller C automatically picks out a measuring range appropriate for each individual external sensor by means of said circuit CR_AGA for the automatic setting of the drive current or by means of said circuit VR_AGA for the automatic setting of the drive voltage. The completed setting of said circuit CR_AGA, VR_AGA is stored in the programmable permanent memory EEPROM as the coarse code ccc, vcc of the current signal and the voltage signal, respectively, from this external sensor.

An output signal v0 of the operational amplifier OpA is conducted to the input of the analogue-to-digital converter ADC through an analogue memory AM controlled by the controller C. The controller C then sends to the analogue-to-digital converter ADC the command sad to perform the analogue-to-digital conversion of the signal put out from said external sensor. The fine code ccf, vcf of the current signal and the voltage signal, respectively, from the external sensor is generated.

But if it was not possible to amplify or to reduce the signal put out from the external sensor to fall within the set interval between vl and vh the controller C sends a signal oor (out of range) to the analogue-to-digital converter ADC.

Said decoder DEC generates signals 1, 2, 3, 4, 5, 6, 7, bv, rv to control switches within the sensor-front-end processor SFEP of processing sensor signals in a way that said processor adapts to a type of an individual cexternal sensor, from which the signal is currently acquired. The control signals by, rv refer to the voltage of the battery B and the reference voltage to be conducted to a terminal VS, to which the external sensor is to be connected. The microcontroller MC controls the decoder DEC by means of signals ss1, ss2, ss3, ss4 to choose the external sensor. The user sets the microcontroller MC through the communication module CM. The setting of individual control switches within the sensor-front-end processor SFEP by means of signals 1, 2, 3, 4 for different types of external sensors is represented in the following table (symbols Si, i=1, 2, 3, 4, 5, 6, 7, represent switches controlled by the signals 1, 2, 3, 4, 5, 6, 7).

According to the invention, the sensor-front-end processor SFEP predrives the external sensors during a predominant part of the total time and keeps doing it until it receives from the microcontroller MC within the RFID smart label ASL the first command sc or the second command st to acquire and condition sensor signals. When these activities are finished the controller C puts out a command pdi (power down internally) to end supplying the blocks within the sensor-front-end processor SFEP except the generator PdIRq for generating the predrive currents pdc1, pdc2 and the request irq to interrupt the predrive.

The invention is indeed disclosed for the external sensors connected to the RFID active smart label but it can also be used for internal sensors integrated in said label.

| Sensor selection | | | | Sensor input | | | | Sensor type | Comments SFEP inputs |
|---|---|---|---|---|---|---|---|---|---|
| ex_3 | ex_2 | ex_1 | ex_0 | PIN name | Pre-drive | irq mode | Auto ranging | | |
| 0 | 0 | 0 | 0 | EXT2-GND | YES | YES | YES | Resist. lin.T depend. | No drive needed VR-AGA, ADAFR |
| | | | | | YES | YES | YES | Reverse diode | S4, S5 |
| | | | | | YES | YES | YES | DC voltage source | |
| | | | | | YES | YES | YES | DC current source | |
| 0 | 0 | 0 | 1 | EXT1-GND | YES | YES | YES | Resist. lin.T depend. | Driven by autom. progr.curr.source CR_AGA S1, S3, S7 |
| 0 | 0 | 1 | 0 | EXT1-GND | YES | NO/YES | NO | DC voltage source | No drive ARMC not active S1, S3 |
| 0-1 | 0 | 1 | 0 | EXT1-EXT2-GND-SWB | YES | NO/YES | NO | Resist. bridge | No drive ARMC not active S1, S3-S2, S3 |
| 0 | 0 | 1 | 1 | EXT1-GND | YES | YES | YES | Capacit. DC | Driven by autom. progr.curr.source Reset with S6 CR_AGA S1, S3, S6, S7 |
| 0 | 1 | 1 | 0 | EXT1 EXC REF0 | | NO | NO | Capacit. no DC | AC excit. at EXC Capac.divid. at EXT1 Sens.connect.to REF0 Excit. amplitude: V_EXT = 2 V_REF0 ARMC not active S1, S3 |
| | | | | SWB | | | | | Switch bv or stable refer. voltage |

The invention claimed is:

1. A method for acquisition and conditioning of signals from external sensors by an RFID active smart label (ASL) by a sensor-front-end processor (SFEP) processing sensor signals and a microcontroller (MC), which are integrated in said label, wherein the sensor-front-end processor (SFEP) predrives external sensors during a predominant part of time with low-intensity electric currents in an order of magnitude of ten nanoamperes and at the same time it is in a low-consumption state consuming electric current with intensity below 250 nA, during the predrive the sensor-front-end processor (SFEP) waits to receive from the microcontroller (MC) a first command (sc), which the microcontroller (MC) outputs in adjustable time intervals, or a second command (st), which the microcontroller (MC) outputs when it is informed by the sensor-front-end processor (SFEP) that a request (irq) to interrupt predriving one of the external sensors was generated, and to acquire and condition the sensor signals, and after reception of said first command (sc) or said second command (st) the sensor-front-end processor (SFEP) stops predriving the external sensors, drives individual external sensors in accordance with each external sensor by a sensor-front-end-processor's temperature-stable precision source, sets its own measuring range in accordance with the external sensor, acquires a coarse code of a current signal and a coarse code of a voltage signal from the external sensor, conditions the sensor signal from the external sensor in order that an analogue-to-digital converter (ADC) within the RFID smart label (ASL) acquires a fine code of the current signal and a fine code of the voltage signal from the external sensor.

2. The method as recited in claim 1, wherein after the reception of the first command (sc) the sensor-front-end processor (SFEP) consecutively acquires and conditions the sensor signals from all external sensors.

3. The method as recited in claim 2, wherein only such data detected by an individual external sensor are stored in a programmable permanent memory (EEPROM) within the RFID smart label (ASL), and wherein a level of said data or a relative change of said level with respect to a previous measurement drops out from a values interval for said external sensor as determined by a user.

4. The method as recited in claim 1, wherein the request (irq) to interrupt predriving one of the external sensors is generated if a level of the sensor signal from said external sensor or a relative change of said level with respect to a previous measurement drops out from a values interval for said external sensor as determined by a user and data detected by this external sensor are stored in the programmable permanent memory (EEPROM) within the RFID smart label (ASL).

5. RFID smart label (ASL) comprising a circuit for acquisition and conditioning of signals from external sensors said circuit including:

a sensor-front-end processor (SFEP) processing sensor signals and integrated in said label wherein the RFID smart label (ASL) further comprises a communication module (CM), a microcontroller (MC), an analogue-to-digital converter (ADC) and a programmable permanent memory (EEPROM), wherein the sensor-front-end processor (SFEP) comprises a generator (PdIRq) for generating predrive currents (pdc1, pdc2) and a request (irq) to interrupt the predrive, wherein said generator is adapted to generate the currents (pdc1, pdc2) to predrive the external sensors for a predominant part of time with low-intensity electric currents in an order of magnitude of ten nanoamperes, wherein the sensor-front-end processor (SFEP) is in a low-consumption state consuming electric current with intensity below 250 nA during said predominant part of time, wherein said generator is adapted to generate the request (irq) to interrupt predriving one of the external sensors if a level of the signal that is output from said external sensor or a relative change of said level with respect to a previous measurement drops out from a values interval for said external sensor as determined by a user, a circuit (ARMC) for an automatic setting of a measuring range and a measuring, wherein said circuit is adapted to, each time after the sensor-front-end processor (SFEP) has stopped predriving the external sensors, set the measuring range for each individual external sensor such that said circuit is adapted to a highest level of output signals from said external sensor such that a signal that is output by the sensor-front-end processor (SFEP) for this external sensor is within a full range of the analogue-to-digital converter (ADC), wherein said circuit is adapted to measure a coarse code of the current signal and a coarse code of the voltage signal from each external sensor before the analogue-to-digital conversion of said signal has been carried out, wherein the analogue-to-digital converter is adapted to determine a fine code of the current signal and a fine code of the voltage signal of each external sensor, wherein said circuit comprises a temperature-stable precision source to drive an individual external sensor during the measurement, a decoder (DEC), which generates signals (1, 2, 3, 4, 5, 6, 7, bv, rv) controlling switches within the sensor-front-end processor (SFEP) such that said processor adapts to a type of each individual external sensor in compliance with a user's setting within the microcontroller (MC) by means of the communication module (CM), and wherein the sensor-front-end processor (SFEP) is adapted to predrive the external sensors until the sensor-front-end processor it receives a first command (sc) or a second command (st) from the microcontroller (MC) to acquire and condition sensor signals.

6. The RFID smart label as recited in claim 5, wherein the microcontroller (MC) outputs out said first command (sc) in adjustable time intervals, and that after reception of the first command (sc), the sensor-front-end processor (SFEP) consecutively acquires and conditions the signals from all external sensors.

7. The RFID smart label as recited in claim 6, wherein only such data detected by an individual external sensor are stored in a programmable permanent memory (EEPROM) within the RFID smart label (ASL), and wherein the level of said data or the relative change in said level with respect to a previous measurement drops out from a values interval for this external sensor as determined by the user.

8. The RFID smart label as recited in claim 5, wherein the microcontroller (MC) outputs said second command (st) if it is informed by the sensor-front-end processor (SFEP) that a request (irq) to interrupt predriving one of the external sensors was generated.

9. The RFID smart label as recited in claim 8, wherein the request (irq) to interrupt predriving one of the external sensors is generated when the level of the sensor signal that is output by said external sensor or the relative change in said level with respect to the previous measurement drops out from a values interval for said external sensor as determined by the user, and wherein data detected by said external sensor are stored in the programmable permanent memory (EEPROM) within the RFID smart label (ASL).

10. The RFID smart label according to claim 5, wherein the generator (PdiRq) for generating the predrive currents (pdc1, pdc2) and the request (irq) to interrupt the predrive generates low-intensity predrive currents and generates the request (irq) to interrupt the predrive ratiometrically with regard to a signal level interval for the individual external sensor as determined by the user.

11. The RFID smart label according to claim 5, wherein the circuit (ARMC) for the automatic setting of the measuring range and the measuring comprises a circuit (CR_AGA) for an automatic adjusting of a current source (ADACS) for an individual external sensor such that the signal from said external sensor remains within a full range of the analogue-to-digital converter (ADC), wherein, in order to end the automatic adjusting, said circuit (CR_AGA) for the automatic adjusting is controlled by a controller (C) in accordance with an output of a window comparator (WC), wherein the sensor signal from said external sensor amplified by an operational amplifier (OpA) is conducted to an input of said window comparator (WC), and further comprises the current source (ADACS) to drive said external sensor, wherein the current source (ADACS) is algorithmically digitally adjusted by said circuit (CR_AGA) for the automatic adjusting of the current source.

12. The RFID smart label as recited in claim 11, wherein the circuit (ARMC) for the automatic setting of the measuring range and measuring comprises:

a circuit (VR_AGA) for an automatic adjusting of the voltage of a reference voltage source (ARVS) for an individual external sensor such that the sensor signal from said external sensor remains within a full range of the analogue-to-digital converter (ADC), wherein, in order to end the automatic adjusting, said circuit (VR_AGA) is controlled by the controller (C) in accordance with the output of the window comparator (WC), wherein the signal from said external sensor amplified by the operational amplifier (OpA) is conducted to the input of said window comparator (WC), and an algorithmically digitally adjustable feedback resistor (ADAFR) of the operational amplifier (OpA), and wherein said feedback resistor (ADAFR) is algorithmically digitally adjusted by said circuit (VR_AGA) for the automatic adjusting of the voltage.

13. The RFID smart label as recited in claim 12, wherein the controller (C) picks out the measuring range appropriate for each of the external sensors by said circuit (CR_AGA) for the automatic setting of the current source or by said circuit (VR_AGA) for the automatic setting of the voltage, the accomplished setting of said circuit (CR_AGA, VR_AGA) is stored in the programmable permanent memory (EEPROM) as the coarse code of the current signal and the coarse code of the voltage signal from said external sensor, and the controller (C) sends to the analogue-to-digital converter (ADC) a command (sad) to perform the analogue-to-digital conversion of the sensor signal that is output from said external sensor such that the fine code of the current signal and the fine code of the voltage signal from said external sensor are generated.

\* \* \* \* \*